United States Patent Office 3,822,262
Patented July 2, 1974

3,822,262
PHENYL ACETYLIMINO-IMIDAZOLINES AND
-HEXAHYDROPYRIMIDINES
John B. Bream, Redbourn, England, and Claude W.
Picard, Berne, Switzerland, assignors to Sandoz-
Wander, Inc., Hanover, N.J.
No Drawing. Original application Feb. 9, 1970, Ser. No.
9,973, now Patent No. 3,634,508. Divided and this
application Oct. 13, 1971, Ser. No. 188,939
Claims priority, application Switzerland, Feb. 20, 1969,
2,575/69; Mar. 27, 1969, 4,691/69; Nov. 7, 1969,
16,575/69
Int. Cl. C07d 51/18
U.S. Cl. 260—256.4 H       2 Claims

ABSTRACT OF THE DISCLOSURE

Compounds of the formula:

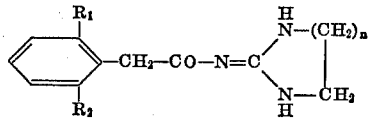

in which
$R_1$ is hydrogen, chlorine or methyl,
$R_2$ is chlorine or methyl, and
$n$ is 1 or 2, and pharmaceutically acceptable acid addition salts thereof.

The compounds are useful in the treatment of hypertonia.

---

This is a division of copending application Ser. No. 9,973, filed Feb. 9, 1970, now U.S. Pat. 3,634,508, issued June 11, 1972. The invention relates to acetyl imidazolidine and hexahydropyrimidine compounds.

The invention provides compounds of formula I,

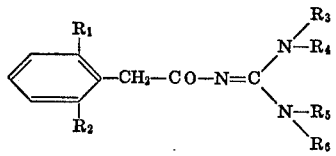

in which
$R_1$ signifies hydrogen, chlorine or methyl,
$R_2$ signifies chlorine or methyl, and
$R_4$ and $R_5$ together form a dimethylene or trimethylene chain, and each of $R_3$ and $R_6$ signifies hydrogen.

In accordance with the invention, the compounds may be obtained by a process characterised by (i) Obtaining a compound of formula I by reacting a compound of formula II,

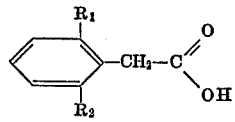

in which $R_1$ and $R_2$ have the above significance, or a reactive functional acid derivative of a compound of formula II, with a compound of formula III,

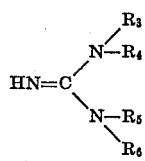

in which $R_3$, $R_4$, $R_5$ and $R_6$ have the above significance, or (ii) Obtaining a compound of formula Ib,

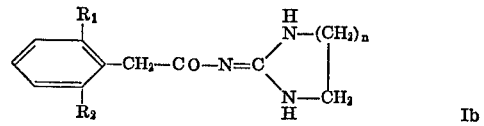

in which
$R_1$ and $R_2$ have the above significance, and
$n$ signifies 1 or 2,
either
(a) by reducing a compound of formula V,

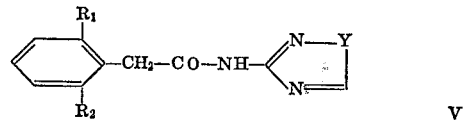

in which
$R_1$ and $R_2$ have the above significance, and
Y signifies a —$CH_2$— or —$CH=CH$— group, or
(b) by reacting a compound of formula IV,

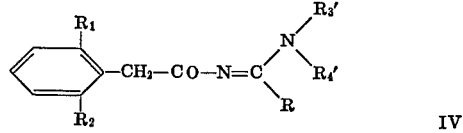

in which
$R_1$ and $R_2$ have the above significance,
$R_3'$ and $R_4'$, which may be identical or different, each signifies hydrogen or an alkyl, hydroxyalkyl, or alkoxyalkyl radical containing up to 6 carbon atoms, and
R signifies a reactive group capable of being split off with a hydrogen atom from an amine, with a diamine of formula

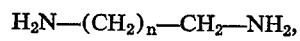

in which $n$ has the above significance.

In method (i) the reaction may be effected in an inert organic solvent, e.g. isopropanol or toluene, or without solvent. A suitable temperature is from room temperature (20–25° C.) to the reflux temperature, preferably room temperature to 80° C. Suitable reactive functional acid derivatives of compounds of formula II include halides, especially chlorides or bromides, or lower alkyl esters. When a halide is used, and it is desired to obtain the free base form of the compound of formula I, the reaction must be effected in the presence of an acid-binding agent, for example triethylamine, or using at least a 100% excess of the compound of formula III. The progress of the reaction may be followed by, for example, establishing the degree of conversion of the starting material by thin layer chromatography.

In method (ii)(b) suitable reactive groups R in the compounds IV include lower alkoxy or alkylmercapto groups, e.g. methoxy or methylthio, and aralkylthio groups, which may optionally be activated by substituents, e.g. p-nitrobenzylthio. The reaction is suitably carried out in the presence of an inert organic solvent, e.g. isopropanol. When ammonia is used, it is suitably in the form of an aqueous, concentrated solution. A preferred procedure involves dissolving the compound IV in an inert organic solvent and adding such ammonia solution or the amine thereto. The reaction is suitably carried out at a temperature from room temperature to reflux temperature. Stirring is normally advantageous. Typical reaction times range from 1 to 10 hours.

The reduction of compounds of formula V in method (ii)(a) may, for example, be effected by the action of hydrogen in the presence of a suitable catalyst, e.g. a noble metal catalyst, especially an Adams catalyst. For this purpose the starting materials of formula V may be dissolved in a suitable organic solvent such as ethanol, and hydrogenation effected with hydrogen at room temperature or with slight heating and at normal pressure, suitably until the theoretical amount of hydrogen is taken up.

The resulting compounds of formula I may be isolated in manner known *per se*, e.g. by extraction, precipitation or salt formation, and may subsequently be purified in manner known *per se*, e.g. by recrystallization.

Conversion of base forms of compounds of formula I into acid addition salt forms, and acid addition salt forms into base forms, may be carried out in conventional manner.

The compounds of formula II used as starting materials as well as their reactive derivatives are known or may be produced from known starting materials by methods known *per se*.

The compounds of formula III used as starting materials are also known or may be produced from known starting materials in manner known *per se*.

The compounds of formula IV, in which R signifies a lower alkoxy or alkylthio group, or an aralkylthio group which may optionally be substituted, used as starting materials, may be obtained by reacting halides, especially chlorides or bromides, of compounds of formula II, with compounds of formulae VI, VII or VIII,

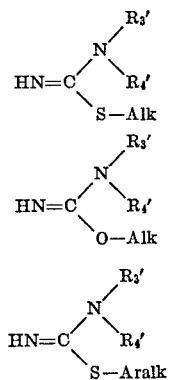

in which formulae

Alk signifies a lower alkyl radical, and
Aralk signifies an optionally substituted aralkyl radical, e.g. the *p*-nitrobenzyl radical, and
$R_3'$ and $R_4'$ have the above significance.

The considerations involved and suitable reaction conditions will be clear to one skilled in the art, particularly after reference to the methods described for preparing compounds I and the following Examples.

Those compounds of formula IV, in which the radical R signifies other than a lower alkoxy, an alkylmercapto or an optionally substituted aralkylthio group, may be produced in analogous manner.

The starting materials of formula V, in which Y signifies a —CH$_2$— group, may be obtained by reacting compounds of formula II or their reactive derivatives with 2-aminoimidazole, and compounds of formula V, in which Y signifies a —CH=CH— group, may be obtained by reacting compounds of formula II or their reactive derivatives with 2-aminopyrimidine. The considerations involved and suitable reaction conditions will be clear to one skilled in the art, particularly after reference to the following Examples and the methods described for compounds I.

The compounds of formula I are useful because they possess pharmacological activity in animals. In particular the compounds are useful in the treatment of hypertonia in general and particularly in the treatment of essential and renal hypertonia, as indicated by a lowering of the blood pressure upon oral or intravenous administration of the compounds in experimentally hypertonic rats (see F. Gross, P. Loustalot and F. Sulser, Arch. exper. Path. Pharmakol. *229*, 381–388, 1956).

The following compounds of the invention have been found to have particularly interesting activity:

2-[2-(2,6-dichlorophenyl)-acetylimino]-imidazolidine,
2-[2-(2,6-dichlorophenyl)-acetylimino]-hexahydropyrimidine, For the above-mentioned use the dosage administered will, of course, vary depending on the compound employed, mode of administration and treatment desired. However, in general, satisfactory results are obtained when administered at a daily dosage of from 0.05 to 10 mg./kg. of animal body weight, preferably administered in divided doses 2 to 4 times daily, or in sustained release form. For most larger mammals the daily dose is in the range of from 5 to 20 mg., and dosage forms suitable for oral administration comprise from about 1 to 10 mg. of the compound admixed with a solid or liquid pharmaceutical diluent or carrier.

The compounds of formula I may be used as medicaments on their own or in the form of appropriate medicinal preparations for oral administration, e.g. in the form of tablets or dragées, or for parenteral administration, e.g. in the form of injectable solutions.

The compounds may also be used in the form of their pharmaceutically acceptable acid addition salts. Examples of suitable inorganic acids for such salt formation are hydrochloric, sulphuric, nitric and phosphoric acid, and examples of suitable organic acids are toluenesulphonic, acetic, malonic, succinic, malic, maleic and tartaric acid.

A preferred tablet composition consists of 10 mg. of compound of formula I, 108 mg. of lactose, 2 mg. of paraffin oil, 1 mg. of gelatin, 13 mg. of maize starch and 6 mg. of talc. This tablet is desirably provided with a breaking slit.

In the following non-limitative Examples all temperatures are uncorrected.

EXAMPLE 1

2-[2-(2,6-Dichlorophenyl)-acetylimino]-imidazolidine

Sodium isopropanolate, produced from 3.45 g. of sodium and 200 cc. of isopropanol, in 200 cc. of isopropanol is added to a solution of 31.95 g. of 2-amino-2-imidazoline hydriodide in 300 cc. of isopropanol, whereupon 32.85 g. of 2,6-dichlorophenyl acetic acid methyl ester are added with stirring. The reaction mixture is allowed to stand at room temperature for 72 hours and is subsequently concentrated by evaporation. The residue is treated twice with 100 cc. of isopropanol and the solution is each time concentrated by evaporation in a vacuum. The residue is dissolved in water and the aqueous solution is washed with ether and sodium hydroxide is added thereto. The precipitated base is filtered with suction, washed with water and dried over phosphorus pentoxide. 2-[2-(2,6-Dichlorophenyl)-acetylimino]-imidazolidine in free base form is obtained in the form of a white powder having a M.P. of 235–236° C. The hydrochloride form has a M.P. of 265–267° C.

EXAMPLE 2

2-[2-(2,6-Dichlorophenyl)-acetylimino]-hexahydropyrimidine

A solution of 21.9 g. of 2,6-dichlorophenyl acetic acid methyl ester in 100 cc. of isopropanol is added with stirring to a solution of 11.9 g. of 2-amino-1,4,5,6-tetrahydropyrimidine in 200 cc. of isopropanol. The reaction mixture is allowed to stand over night, whereupon it is concentrated by evaporation in a vacuum, the residue is taken up several times in isopropanol and the solution is each time concentrated by evaporation in a vacuum. The resulting residue is washed with ether, crystallized from methanol/ether containing 0.15 mols of hydrochloric acid and recrystallized from methanol. 2-[2-(2,6-Dichlorophenyl)-acetylimino]-hexahydropyrimidine in hydrochloride form is obtained in the form of white needles having a M.P. of 285-287° C.

EXAMPLE 3

2-[2-(2,6-Dichlorophenyl)-acetylimino]-hexahydropyrimidine 3 g. of 2-(2,6-dichlorophenyl-acetamido)-pyrimidine in 400 cc. of absolute ethanol containing 0.005 mols of dry hydrogen chloride gas are hydrogenated in the presence of 0.5 g. of Adams catalyst at room temperature. After 15 minutes the taking up of hydrogen is completed and the catalyst is filtered off and the filtrate concentrated to about 20 cc. Upon cooling a while solid substance is formed, which is filtered off, washed with ether, dried at 70° C. and crystallized twice from methanol/ether. 2-[2-(2,6 - Dichlorophenyl) - acetylimino] - hexahydropyrimidine in hydrochloride form is obtained in the form of white needles having a M.P. of 283-286° C. (decomp.), this product being identical with the product obtained in accordance with Example 2.

EXAMPLE 4

2-[2-(2,6-Dichlorophenyl)-acetylimino]-imidazolidine 2.8 g. of S-methyl-N-(2,6-dichlorophenyl-acetyl)-isothiourea are added to 0.6 g. of ethylene diamine, whereby the mixture warms slightly and methyl mercaptan escapes. The solid substance obtained after cooling the reaction mixture is separated, is stirred with 20 cc. of ethylene diamine, filtered off, washed with water and taken up in 100 cc. of dilute hydrochloric acid. The hydrochloric acid suspension is filtered in order to remove starting material and the filtrate is made alkaline with dilute caustic soda solution. The precipitated base is separated, washed and treated with isopropanol, whereby 2-[2-(2,6-dichlorophenyl)-acetylimino]-imidazolidine is obtained in the form of a white powder having a M.P. of 234-237° C., this product being identical with the product obtained in accordance with Example 1.

The starting material used in this Example may be obtained as follows:

A solution of 5.6 g. of 2,6-dichlorophenyl acetic acid chloride in 10 cc. of acetone is slowly added to a solution of 4.7 g. of S-methyl isothiourea in 120 cc. of acetone. The precipitated S-methyl isothiouronium chloride is filtered off and the filtrate concentrated by evaporation. The residue is crystallized twice from diisopropyl ether, whereby S-methyl-N-(2,6-dichlorophenyl-acetyl)-isothiourea is obtained in the form of white rhombic crystals having a M.P. of 125-127° C.

What is claimed is:

1. The compound which is 2-[2-(2,6-Dichlorophenyl)-acetylimino]-imidazolidine or a pharmaceutically acceptable acid addition salt thereof.

2. The compound which is 2-[2-(2,6-Dichlorophenyl)-acetylimino]-hexahydropyrimidine or a pharmaceutically acceptable acid addition salt thereof.

References Cited

UNITED STATES PATENTS 3,168,520   2/1965   Kleemann et al. ____ 260—256.4

DONALD G. DAUS, Primary Examiner

R. V. RUSH, Assistant Examiner

U.S. Cl. X.R.

260—309.7